(12) United States Patent
Ikarashi et al.

(10) Patent No.: US 9,789,639 B2
(45) Date of Patent: Oct. 17, 2017

(54) MOLD-CLAMPING DEVICE, INJECTION-MOLDING DEVICE, AND METHOD FOR OPENING AND CLOSING MOLD

(71) Applicant: Mitsubishi Heavy Industries Plastic Technology Co., Ltd., Nagoya-shi, Aichi (JP)

(72) Inventors: Masaaki Ikarashi, Nagoya (JP); Mamoru Kawasaki, Nagoya (JP); Takehiro Irie, Nagoya (JP); Toshihiko Kariya, Nagoya (JP)

(73) Assignee: MITSUBISHI HEAV INDUSTRIES PLASTIC TECHNOLOGY CO., LTD., Nagoya-shi, Aichi (JP)

( * ) Notice: Subject to any disclaimer, the term of this patent is extended or adjusted under 35 U.S.C. 154(b) by 137 days.

(21) Appl. No.: 14/426,813

(22) PCT Filed: Jan. 30, 2013

(86) PCT No.: PCT/JP2013/052094
§ 371 (c)(1),
(2) Date: Mar. 9, 2015

(87) PCT Pub. No.: WO2014/061283
PCT Pub. Date: Apr. 24, 2014

(65) Prior Publication Data
US 2015/0273750 A1 Oct. 1, 2015

(30) Foreign Application Priority Data
Oct. 17, 2012 (JP) ................................. 2012-229764

(51) Int. Cl.
| B29C 45/76 | (2006.01) |
| B22D 17/26 | (2006.01) |

(Continued)

(52) U.S. Cl.
CPC ........ *B29C 45/7653* (2013.01); *B22D 17/266* (2013.01); *B29C 45/67* (2013.01);
(Continued)

(58) Field of Classification Search
CPC .. B29C 45/67; B29C 45/6728; B29C 45/7653
See application file for complete search history.

(56) References Cited

U.S. PATENT DOCUMENTS

| 6,527,540 B1* | 3/2003 | Dantlgraber | B29C 45/67 264/328.1 |
| 9,038,526 B2* | 5/2015 | Liu | F15B 11/0423 91/404 |
| 2013/0313746 A1* | 11/2013 | Ikarashi | B29C 45/67 264/40.1 |

FOREIGN PATENT DOCUMENTS

| CN | 101758607 A | 6/2010 |
| JP | H02-027125 B2 | 6/1990 |

(Continued)

OTHER PUBLICATIONS

Japan Patent Office, "Notice of Allowance for JP 2012-229764," Sep. 29, 2015.

(Continued)

*Primary Examiner* — Jill Heitbrink
(74) *Attorney, Agent, or Firm* — Manabu Kanesaka; Benjamin Hauptman; Kenneth Berner

(57) ABSTRACT

A mold-clamping device includes a fixed mold plate including a fixed mold; a movable mold plate including a movable mold; a hydraulic cylinder allowing the movable mold plate to approach or be separated from the fixed mold plate; a hydraulic pressure supply source supplying a hydraulic fluid to the hydraulic cylinder; and a control unit performing driving control on the hydraulic pressure supply source. The control unit includes a flow rate decrease control unit for deceleration for decreasing a flow rate of the hydraulic fluid (Continued)

according to a deceleration gradient set in advance when a movement of the movable mold plate is decelerated according to the deceleration gradient, and a flow rate increase control unit for controlling the flow rate of the hydraulic fluid to increase when the flow rate of the hydraulic fluid is decreased according to the deceleration gradient by the flow rate decrease control unit.

7 Claims, 8 Drawing Sheets

(51) Int. Cl.
*B29C 45/67* (2006.01)
*B29C 33/24* (2006.01)

(52) U.S. Cl.
CPC .......... *B29C 45/6728* (2013.01); *B29C 33/24* (2013.01); *B29C 2945/76548* (2013.01); *B29C 2945/76595* (2013.01); *B29C 2945/76869* (2013.01)

(56) References Cited

FOREIGN PATENT DOCUMENTS

| JP | H04-074631 A | 3/1992 |
|---|---|---|
| JP | H05-029725 U | 4/1993 |
| JP | H07-080904 A | 3/1995 |
| JP | 2524531 Y2 | 2/1997 |
| JP | 2001-129861 A | 5/2001 |
| JP | 3377564 B2 | 2/2003 |
| JP | 2011-073230 A | 4/2011 |
| JP | 2012-096473 A | 5/2012 |
| WO | 2012/137320 A1 | 10/2012 |

OTHER PUBLICATIONS

China Patent Office, "Office Action for Chinese Patent Application No. 201380046618.5," Dec. 31, 2015.

PCT/ISA/210, "International Search Report for PCT/JP2013/052094", Aug. 5, 2013.

PCT/ISA/237, "Written Opinion of the International Searching Authority for PCT/JP2013/052094", Aug. 5, 2013.

PCT/ISA/210, "International Search Report for PCT/JP2013/052094," May 7, 2013.

PCT/ISA/237, "Written Opinion of the International Searching Authority for PCT/JP2013/052094," May 7, 2013.

* cited by examiner

US 9,789,639 B2

1

MOLD-CLAMPING DEVICE, INJECTION-MOLDING DEVICE, AND METHOD FOR OPENING AND CLOSING MOLD

RELATED APPLICATIONS

The present application is National Phase of International Application No. PCT/JP2013/052094 filed Jan. 30, 2013, and claims priority from Japanese Application No. 2012-229764, filed Oct. 17, 2012, the disclosure of which is hereby incorporated by reference herein in its entirety.

TECHNICAL FIELD

The present invention relates to a mold-clamping device, an injection-molding device, and a method for opening and closing a mold.

Priority is claimed to Japanese Patent Application No. 2012-229764, filed Oct. 17, 2012, the entire content of each of which is incorporated herein by reference.

BACKGROUND ART

In a mold-clamping device such as an injection molding machine and a press molding machine, a plurality of hydraulic pumps having a relatively small capacity are used and the number of the hydraulic pumps in operation is changed to correspond to a flow rate change according to a piston speed of a hydraulic cylinder so that the device can be compact in size and mold opening and closing can be accelerated.

In a case where the plurality of hydraulic pumps are used as described above, the plurality of hydraulic pumps are turned OFF one after another for a phased oil amount decrease when a piston of the hydraulic cylinder is decelerated from a high speed to a low speed. In this case, the amount of a hydraulic oil in the hydraulic cylinder is likely to be temporarily short of a required oil amount after initiation of the deceleration of the piston of the hydraulic cylinder so that a cylinder chamber on a supply side of the hydraulic cylinder has a negative pressure therein, a gap is generated in the cylinder chamber, and a temporary stop and a stick-slip occur in a movable mold plate.

According to a known technique, a main hydraulic pump in which the oil amount is controlled by a proportional solenoid valve is disposed so as to prevent the temporary stop and the stick-slip in the movable mold plate, and the main hydraulic pump is lastly and gradually decreased from a maximum oil amount when the plurality of hydraulic pumps are turned OFF one after another for the phased oil amount decrease with the main hydraulic pump at the maximum oil amount so that the hydraulic oil is prevented from having the negative pressure (for example, refer to PTL 1).

According to another known technique, a check valve is put into operation by using a negative pressure, a hydraulic oil is supplied to a hydraulic cylinder from a hydraulic oil tank, and the negative pressure is released in a case where the hydraulic cylinder has the negative pressure therein and a hydraulic circuit has the negative pressure so as to shorten the length of a stop time attributable to a temporary stop and a stick-slip in a movable mold plate (for example, refer to PTL 2).

2

CITATION LIST

Patent Literature

[PTL 1] Japanese Patent No. 3377564
[PTL 2] Japanese Registered Utility Model No. 2524531

SUMMARY OF INVENTION

Technical Problem

However, the technique described in PTL 1 described above is oil amount control corresponding to a deceleration gradient of the piston set in advance. Therefore, the actual speed of the hydraulic cylinder pulled by a movement of the movable mold plate may increase to exceed the movement speed of the hydraulic cylinder by a hydraulic oil supply flow rate when an operation of the movable mold plate by inertia increases and the actual deceleration gradient (illustrated by the solid line in FIG. 7) deviates to a high-speed side from the deceleration gradient set in advance (illustrated by the dashed line in FIG. 7) as a result of a change caused in a case where a lubrication resistance of a sliding section of the movable mold plate decreases as illustrated in FIG. 7, in a case where a weight of a mold attached to the movable mold plate increases, or the like. As a result, the amount of the supplied hydraulic oil may not follow an expansion in the volume of an oil chamber of the hydraulic cylinder, the hydraulic cylinder may have the negative pressure therein, and the temporary stop and the stick-slip may occur in the movable mold plate.

In most cases, speed setting for the movable mold plate of the injection molding machine is control by discontinuous and phased switching setting at a predetermined position. However, in a case, for example, where multi-stage deceleration switching setting (illustrated by the dashed line in FIG. 8) is performed by a user during a piston deceleration step as illustrated in FIG. 8, control is performed for a limit of the piston deceleration gradient (illustrated by the solid line in FIG. 8) to be suddenly exceeded at the speed switching position. In this case, as in FIG. 7 described above, the movable mold plate continues moving due to the inertia even after the decrease in the flow rate of the hydraulic oil is stopped, and the hydraulic cylinder may have the negative pressure therein and the temporary stop and the stick-slip may occur in the movable mold plate.

Herein, it is conceivable, for example, that the flow rate of the hydraulic oil be feedback-controlled based on the movement speed of the movable mold plate. However, this leads to an increase in the number of components such as sensors detecting the movement speed of the movable mold plate and an increased complexity of the control, and may result in higher costs.

In the case of attempting to adjust the flow rate of the hydraulic oil by using a proportional solenoid valve, a servo valve, and the like, a pressure loss may occur in a flow path in the valve. Accordingly, a pressure of a hydraulic pressure source that is an upstream of the valve has to be maintained at a pressure raised by at least the pressure loss to a pressure required for an hydraulic actuator in order to obtain a desire pressure on the hydraulic actuator side which is a downstream of the valve. This may lead to a significant energy loss.

In the case of the technique described in PTL 2 described above, the hydraulic oil is supplied from the hydraulic oil tank by using the negative pressure generated in the hydraulic cylinder. Accordingly, the time during which the temporary stop and the stick-slip occurring in the movable mold plate continue can be shortened. However, if the hydraulic cylinder does not have the negative pressure therein, that is, a driving force of the hydraulic cylinder disappears and the negative pressure in a driving side oil chamber that is an operation resistance of the hydraulic cylinder is not generated, suctioning of the oil into the hydraulic cylinder is impossible and it is difficult to prevent the generation of the temporary stop and the stick-slip. In addition, the hydraulic oil is supplied by using a pressure drop, and thus time is taken to suction the hydraulic oil from the hydraulic oil tank and it may be difficult to further shorten the time during which the temporary stop and the stick-slip occur.

This disclosure provides a mold-clamping device, an injection-molding device, and a method for opening and closing a mold capable of reliably preventing occurrence of a temporary stop and a stick-slip attributable to a pressure drop in a hydraulic cylinder with a simple configuration causing little energy loss and capable of accelerating mold opening and closing.

Solution to Problem (1) According to a first aspect of the present invention, there is provided a mold-clamping device including a fixed mold plate having a fixed mold, a movable mold plate having a movable mold, a hydraulic cylinder allowing the movable mold plate to approach or be separated from the fixed mold plate, a hydraulic pressure supply source supplying a hydraulic fluid to the hydraulic cylinder, and a control unit performing driving control on the hydraulic pressure supply source, in which the control unit has flow rate decrease control means for deceleration for decreasing a flow rate of the hydraulic fluid according to a deceleration gradient set in advance when a movement of the movable mold plate is decelerated according to the deceleration gradient set in advance, and flow rate increase control means for controlling the flow rate of the hydraulic fluid to increase when the flow rate of the hydraulic fluid is decreased according to the deceleration gradient set in advance by the flow rate decrease control means for deceleration.

According to this configuration, the flow rate of the hydraulic fluid supplied to the hydraulic cylinder can be decreased according to a predetermined deceleration gradient set in advance by the flow rate decrease control means for deceleration during the deceleration of the movement of the movable mold plate as in a displacement from a high speed to a low speed. In addition, the flow rate of the hydraulic fluid supplied to the hydraulic cylinder can be increased by the flow rate increase control means and a more-than-necessary hydraulic pressure drop can be prevented even in a case where the speed of the movable mold plate is unlikely to be dropped by an increase in a mass of a mold attached to the movable mold plate, a drop in a sliding resistance of a movable mold plate operation, or the like and the actual deceleration gradient becomes gentler than the predetermined deceleration gradient set in advance.

(2) The mold-clamping device according to (1) described above may further include a hydraulic pressure detection unit detecting a hydraulic pressure of the hydraulic fluid supplied to the hydraulic cylinder, and determining means for determining whether or not a pressure in the hydraulic cylinder is lower than a predetermined positive pressure set in advance, in which the flow rate increase control means increases the flow rate of the hydraulic fluid when the flow rate of the hydraulic fluid is decreased by the flow rate decrease control means for deceleration in a case where the pressure in the hydraulic cylinder is determined to be lower than the predetermined pressure by the determining means.

According to this configuration, a pressure drop in the hydraulic cylinder can be detected based on the actual hydraulic pressure. In addition, the flow rate of the hydraulic fluid can be increased at a point of time when the pressure in the hydraulic cylinder is determined to be lower than the predetermined positive pressure. Accordingly, the hydraulic pressure can be increased before the hydraulic pressure is dropped to a negative pressure at which a temporary stop or a stick-slip occurs in the movable mold plate.

(3) In the mold-clamping device according to (2) described above, the flow rate increase control means may perform feedback control so that the pressure in the hydraulic cylinder becomes the predetermined pressure in a case where the pressure in the hydraulic cylinder is determined to be lower than the predetermined pressure by the determining means.

According to this configuration, the pressure in the hydraulic cylinder that is lower than the predetermined pressure can be smoothly and reliably raised to the predetermined pressure through the feedback control.

(4) The mold-clamping device according to (1) described above may further include a speed detection unit detecting a movement speed of the hydraulic cylinder and comparison means for comparing a deceleration gradient of the movement speed of the hydraulic cylinder to the deceleration gradient set in advance, in which the flow rate increase control means may increase the flow rate of the hydraulic fluid when the flow rate of the hydraulic fluid is decreased by the flow rate decrease control means for deceleration in a case where a speed of the hydraulic cylinder is determined to exceed a predetermined speed gradient set in advance by a predetermined amount or by a predetermined ratio by the comparison means.

According to this configuration, an increase in the movement speed of the hydraulic cylinder can be detected based on the actual movement speed of the hydraulic cylinder. The flow rate of the hydraulic fluid can be increased at a point of time when the movement speed of the hydraulic cylinder is determined to exceed a predetermined speed gradient set in advance by a predetermined amount or by a predetermined ratio. Accordingly, the hydraulic pressure can be increased before the hydraulic pressure is dropped to the negative pressure at which the temporary stop or the stick-slip occurs in the movable mold plate. In most cases where speed feedback control is performed on the hydraulic cylinder, a four port-type servo valve provided with fluid ports communicating respectively with a hydraulic fluid inlet side and a hydraulic fluid outlet side of the hydraulic cylinder is used to control the amount of supply of the hydraulic fluid and the amount of discharge of the hydraulic fluid at the same time and load a brake by throttling a back pressure side so that speed control can be performed without causing any speed control error attributable to inertia of the hydraulic cylinder (particularly, temporary stop of a hydraulic actuator operation). Even in a case where a three port-type servo valve is used, a back pressure having a predetermined value remains loaded, and thus the control can be performed, similarly to the above, without causing the speed control error attributable to the inertia of the hydraulic cylinder. However, according to the aspect of the present invention described above, the temporary stop of the hydraulic actuator operation can be prevented, without having to use an expensive servo valve, despite a type of speed feedback control.

(5) In the mold-clamping device according to (1) to (4) described above, the hydraulic pressure supply source may have a main pump controlled to be driven by the flow rate decrease control means for deceleration and a secondary pump controlled to be driven by the flow rate increase control means.

According to this configuration, the flow rate of the hydraulic fluid can be increased by using the secondary pump while the flow rate of the main pump is being decreased when the movement of the movable mold plate is decelerated. In addition, in the mold-clamping device in which a plurality of hydraulic pumps are used to drive the hydraulic cylinder, the hydraulic pump that is stopped during the deceleration of the movable mold plate can be effectively used as the secondary pump increasing the flow rate of the hydraulic fluid.

(6) In the mold-clamping device according to (2) to (5) described above, the flow rate increase control means may stop increasing in the flow rate of the hydraulic fluid a predetermined time after initiation of the increase in the flow rate of the hydraulic fluid.

For example, time within a range in which no practical problem is posed from the initiation of the supply of the hydraulic fluid to the rise in the hydraulic pressure can be measured in advance and obtained by the flow rate increase control means. In this case, the control can be performed without having to perform a complex calculation such as detection of the movement speed of the movable mold plate and detection of the pressure in the hydraulic cylinder for a comparison to the predetermined pressure determined in advance. Accordingly, the increase in the flow rate of the hydraulic fluid can be stopped with a high response and at a practical timing.

(7) According to a second aspect of the present invention, there is provided an injection-molding device including the mold-clamping device according to (1) to (6) above.

According to this configuration, the temporary stop and the stick-slip in the movable mold plate can be prevented and the mold-clamping device can be driven at a higher speed, and thus injection molding cycle time can be shortened.

(8) According to a third aspect of the present invention, there is provided a method for opening and closing a mold for a mold-clamping device having a fixed mold plate having a fixed mold, a movable mold plate having a movable mold, and a hydraulic cylinder allowing the movable mold plate to approach or be separated from the fixed mold plate, the method including a flow rate increase step for increasing a flow rate of a hydraulic fluid supplied to the hydraulic cylinder when the movable mold plate is decelerated in a case where a pressure in the hydraulic cylinder is determined to be lower than a predetermined positive pressure lower than a minimum driving pressure of the hydraulic cylinder so that the pressure in the hydraulic cylinder reaches at least the predetermined pressure.

According to this, the flow rate of the hydraulic fluid can be increased at a timing at which the hydraulic pressure in the hydraulic cylinder is the predetermined positive pressure lower than the minimum driving pressure at which the hydraulic cylinder can be driven when the movement of the movable mold plate is decelerated. Accordingly, a drop in the pressure in the hydraulic cylinder to the point of generating the temporary stop or the stick-slip in the movable mold plate can be prevented.

Advantageous Effects of Invention

According to the mold-clamping device, the injection-molding device, and the method for opening and closing a mold of the respective aspects of the present invention described above, the temporary stop and the stick-slip attributable to the pressure drop in the hydraulic cylinder can be reliably prevented with a simple configuration causing little energy loss and mold opening and closing can be accelerated.

DESCRIPTION OF EMBODIMENTS

A mold-clamping device, an injection-molding device, and a method for opening and closing a mold according to an embodiment of the present invention will be described with reference to accompanying drawings.

Figure 1:
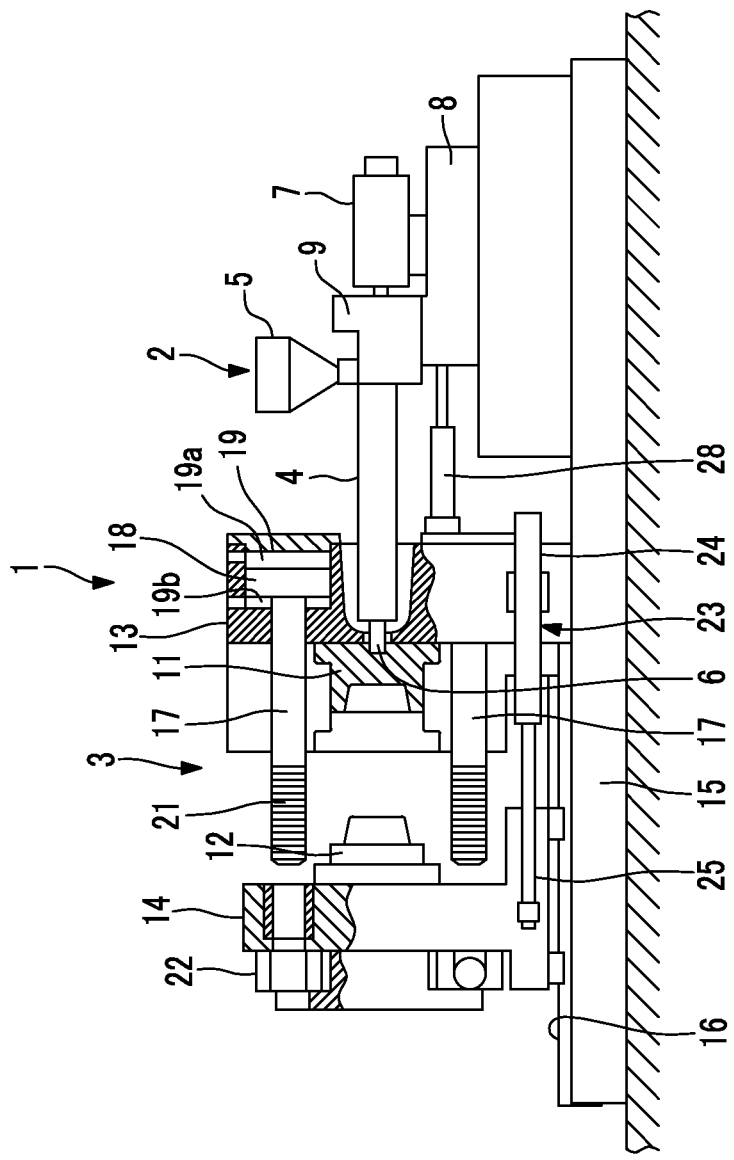
FIG. 1 is a side view illustrating a schematic configuration of an injection-molding device according to an embodiment of the present invention.

FIG. 1 is a configuration diagram illustrating a schematic configuration of the injection-molding device according to this embodiment.

As illustrated in FIG. 1, an injection-molding device 1 is provided with an injection device 2 and a mold-clamping device 3.

In the injection device 2, a heating barrel section 4 is disposed to extend in a horizontal direction from a housing 9 that is fixed to an upper surface of a slide 8. A hopper 5, which is used to charge a molding material, is attached to an upper surface of the housing 9 to communicate with a base portion side upper portion of the heating barrel section 4. The heating barrel section 4 heats the molding material and injects and fills the mold with the molding material at a high pressure.

An injection nozzle 6 is formed at one end of the heating barrel section 4 on the mold-clamping device 3 side. A screw (not illustrated) is insertion-fitted into the heating barrel section 4 to be capable of rotating with respect to the heating barrel section 4 and moving in the horizontal direction. An actuator 7, which is capable of moving the screw disposed in the heating barrel section 4 in the horizontal direction and relatively moving with respect to the slide 8, is attached to the side of the heating barrel section 4 opposite to the injection nozzle 6.

An electric actuator such as an electric motor-driven ball screw and a linear motor can be used as the actuator 7. An electric motor such as an inverter motor, a servomotor, and an IPM motor capable of rotation speed control can be used as a motor (not illustrated) that drives the screw to rotate. In this embodiment, the electric actuator is illustrated as the actuator 7. However, the actuator 7 may be a hydraulic actuator, such as a hydraulic cylinder, instead of the electric actuator. In this case, a vane-type or piston-type hydraulic pressure motor can be used as the motor (not illustrated) that drives the screw to rotate. Even in a case where the hydraulic actuator is used as the actuator 7, the electric motor may be used as the motor that drives the screw to rotate.

The screw in the heating barrel section 4 is driven to rotate so that the molding material charged from the hopper 5 is gradually transported to the injection nozzle side. During the transport, the molding material is heated, plasticized, and melted. When the screw is pressed to the injection nozzle 6 side by the actuator 7, a compressive force acts on the plasticized molding material, and the molding material is injected from the injection nozzle 6 into the mold in the mold-clamping device 3.

The mold-clamping device 3 performs opening and closing on a fixed mold 11 and a movable mold 12 that face each other. The fixed mold 11 is supported by a fixed mold plate 13 that is disposed to be erected on the injection device 2 side of the mold-clamping device 3. The movable mold 12 is supported by a movable mold plate 14 that is disposed to be erected on the side opposite to the injection device 2 side. The fixed mold plate 13 is supported to be fixed with respect to a base section 15. The movable mold plate 14 is supported to be slidable along a guide 16, which is disposed to extend on the base section 15, to approach and be separated from the fixed mold plate 13.

A plurality of tie bars 17, more specifically, four tie bars 17, that extend in the horizontal direction are attached to the fixed mold plate 13. Each of the tie bars 17 is provided with a piston head 18 at one end. The end portions where the piston heads 18 are provided are insertion-fitted into a hydraulic mold clamping cylinder that is disposed at four corners of the fixed mold plate 13. The mold clamping cylinder 19 is provided with two cylinder chambers 19$a$ and 19$b$ that are partitioned in an axial direction of the mold clamping cylinder 19 by the piston heads 18. The piston heads 18 slide in response to a difference between hydraulic pressures of hydraulic fluids that are supplied into the cylinder chambers 19$a$ and 19$b$, and the tie bars 17 can be displaced in the extension direction. An example in which the mold clamping cylinder 19 is disposed at the four corners of the fixed mold plate 13 is illustrated in this embodiment. However, the mold clamping cylinder 19 may also be a direct pressure-type mold clamping cylinder that is placed on a rear surface of the movable mold plate 14 (surface on the side opposite to the fixed mold plate 13).

Gripped portions 21 of the tie bars 17 are disposed on the movable mold plate 14 side. In the gripped portions 21, a plurality of annular groove-shaped irregularities are formed on outer peripheral surfaces of the tie bars 17. Tie bar gripping devices 22, which disengageably grip the gripped portions 21 of the tie bars 17, are attached to the movable mold plate 14. In addition, an ejector (not illustrated), which presses an injection-molded molded object and releases the molded object from the movable mold 12, is attached to the movable mold plate 14. The ejector presses and releases the molded object by moving forward/backward a rod member (not illustrated) by using an electric actuator or the like. The ejector may be a hydraulic actuator such as a hydraulic cylinder.

A mold opening and closing cylinder (hydraulic cylinder) 23 that slidingly moves the movable mold plate 14 when the mold is opened/closed is attached between the fixed mold plate 13 and the movable mold plate 14. The mold opening and closing cylinder 23 is provided with an outer tube 24 that is fixed to the fixed mold plate 13 and an inner rod 25 that is fixed to the movable mold plate 14. When the mold opening and closing cylinder 23 having this configuration is displaced in a retraction direction, the movable mold plate 14 is slidingly moved to approach the fixed mold plate 13. When the mold opening and closing cylinder 23 is displaced in an extension direction, the movable mold plate 14 is slidingly moved to be separated from the fixed mold plate 13.

The injection device 2 described above can be relatively moved, in an extension direction of the heating barrel section 4, with respect to the fixed mold plate 13. A nozzle touch cylinder 28 that adjusts a distance between the fixed mold plate 13 and the injection device 2 is attached between the fixed mold plate 13 and the injection device 2. When the nozzle touch cylinder 28 is displaced in the retraction direction, the injection nozzle 6 is moved to an injection position at which a resin is injected into the fixed mold 11, that is, a position at which the injection nozzle 6 abuts against the fixed mold 11. When the nozzle touch cylinder 28 is displaced in the extension direction, the injection nozzle 6 is separated from the fixed mold 11.

Next, an operation of the injection-molding device 1 described above will be described.

Firstly, the movable mold plate 14 is moved to the fixed mold plate 13 side by the mold opening and closing cylinder 23 and the movable mold 12 abuts against the fixed mold 11. Then, or at the same time as the operation for abutting the movable mold 12 against the fixed mold 11, the tie bars 17 and the movable mold plate 14 are connected to each other by the tie bar gripping devices 22. Then, the tie bars 17 are displaced to the injection device 2 side by the mold clamping cylinder 19 and the movable mold 12 is in press-contact with the fixed mold 11. In addition, the injection nozzle 6 is allowed to be in press-contact with the fixed mold 11 by the nozzle touch cylinder 28. Then, the plasticized molding material is injected into the mold from the injection nozzle 6 of the injection device 2 and the molding material is cooled and molded while a holding pressure is being added.

Then, the tie bar gripping devices 22 are opened and the connection between the tie bars 17 and the movable mold plate 14 is released after the press-contact between the movable mold 12 and the fixed mold 11 is released by removing the hydraulic pressure from the mold clamping cylinder 19 or after the movable mold 12 is separated by a small distance from the fixed mold 11 by removing the hydraulic pressure from the mold clamping cylinder 19 and releasing the press-contact between the movable mold 12 and the fixed mold 11. Then, the movable mold plate 14 is moved at a high speed, by the mold opening and closing cylinder 23, in the direction opposite to the fixed mold plate 13 and the fixed mold 11 and the movable mold 12 are opened with a distance sufficient for taking out a molded article.

Then, the molded object that is in close contact with the movable mold 12 side is pressed and released from an inner side by the ejector and the molded article is taken out. In a case where the molded object is in close contact with the fixed mold 11 side, the molded object is taken out by the ejector on the fixed mold 11 side.

One cycle for forming the molded object from the molding material is terminated through the processing described above. The cycle described above is repeated for mass production of the molded object.

Hereinafter, a configuration of a hydraulic pressure circuit that controls driving of the mold opening and closing cylinder 23 of the mold-clamping device 3 described above will be described.

Figure 2:
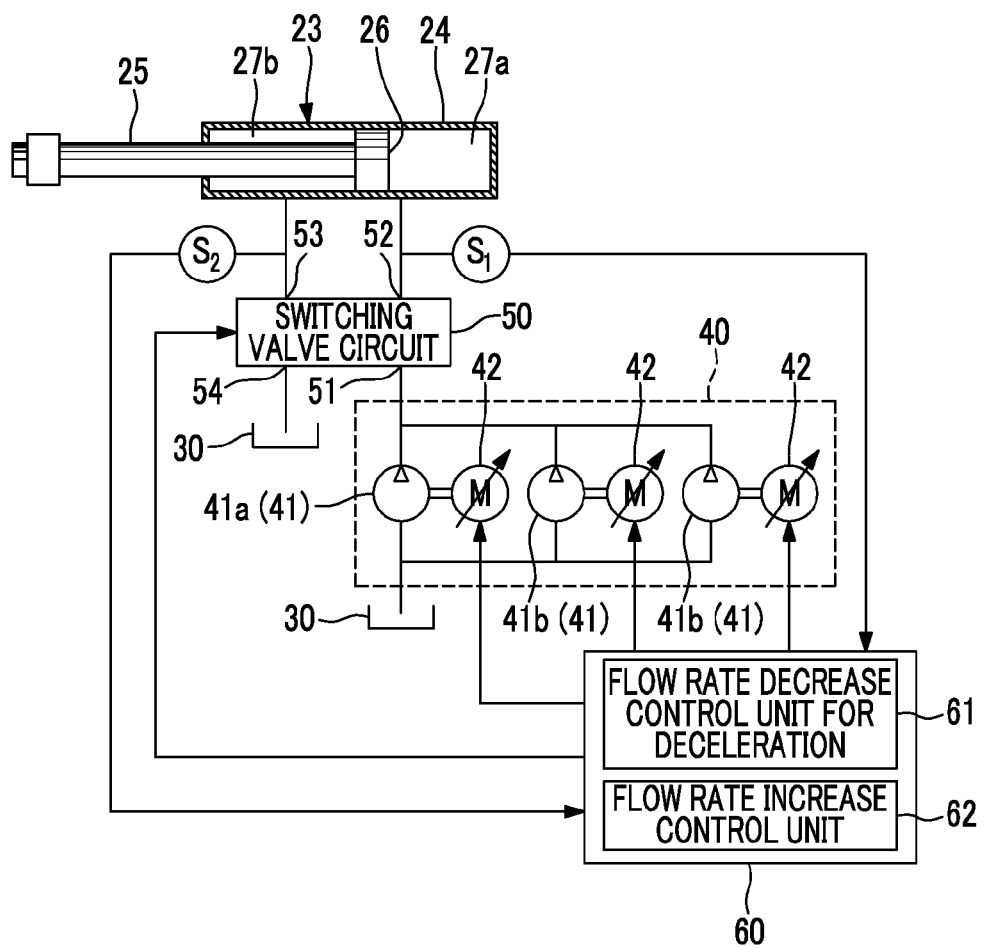
FIG. 2 is a diagram illustrating a control circuit that drives a mold opening and closing cylinder of a mold-clamping device according to the embodiment.

As illustrated in FIG. 2, the mold opening and closing cylinder 23 has a piston head 26 at an end portion of the inner rod 25 that is placed in the outer tube 24. An inner portion of the outer tube 24 is partitioned by the piston head 26 so that two cylinder chambers 27a and 27b are formed. The piston head 26 slides in the axial direction in response to the difference between the hydraulic pressures of the hydraulic fluids that are supplied to the respective cylinder chambers 27a and 27b. The sliding of the piston head 26 causes the inner rod 25 to be displaced in an extension direction of the inner rod 25.

The mold-clamping device 3 is provided with a hydraulic fluid tank 30 that stores the hydraulic fluid, which is used to drive the mold opening and closing cylinder 23, under atmospheric pressure. Each of a hydraulic pressure supply source 40 and a switching valve circuit 50 is connected to the hydraulic fluid tank 30. The hydraulic fluid in the hydraulic fluid tank 30 is supplied to the hydraulic pressure supply source 40 and the hydraulic fluid returns from the switching valve circuit 50 into the hydraulic fluid tank 30.

The hydraulic pressure supply source 40 is provided with a plurality of hydraulic pumps 41 that increase the pressure of the hydraulic fluid and discharge the hydraulic fluid. One main pump 41a and a plurality of secondary pumps 41b constitute the plurality of hydraulic pumps 41. The plurality of hydraulic pumps 41 are connected in parallel to each other. The main pump 41a and the secondary pumps 41b are driven to rotate by servomotors 42 that are driven according to a control command of a control unit 60. An output port of the hydraulic pressure supply source 40 is connected to an input port 51 of the switching valve circuit 50. Since the hydraulic pressure supply source 40 is provided with the plurality of parallel hydraulic pumps 41, an increase in size of the hydraulic pump 41 can be suppressed. Since the hydraulic pressure supply source 40 is provided with the plurality of parallel hydraulic pumps 41, the secondary pumps 41b can be stopped when a high flow rate is not required, and thus energy loss can be reduced. The number of the secondary pumps 41b disposed in this embodiment is two. However, the number of the secondary pumps 41b disposed is not limited to two and may be three or higher. Various types of pumps can be used as the hydraulic pumps 41, and representative examples of which include variable capacity pumps, fixed capacity pumps, and servomotor-driven pumps. It is preferable that the hydraulic pumps 41 are the fixed capacity pumps or the servomotor-driven pumps in order to increase the amount of the hydraulic fluid with a high response. A hydraulic pump in which the fixed capacity pump is driven by a servomotor is more preferable for increasing the amount of the hydraulic fluid with the high response.

The switching valve circuit 50 has the one input port 51 that is connected to the hydraulic pressure supply source 40, two output ports 52 and 53 that are connected to the respective cylinder chambers 27a and 27b, and one drain port 54 that is connected to the hydraulic fluid tank 30. The switching valve circuit 50 switches communication states between the one input port and the two output ports 52 and 53 by using a direction switching valve or the like according to the control command of the control unit 60. Specifically, the switching valve circuit 50 switches between a state where the input port 51 communicates with the output port 52 on the cylinder chamber 27a side and a state where the input port 51 communicates with the output port 53 on the cylinder chamber 27b side.

In addition, the switching valve circuit 50 maintains a communication state between one of the output ports 52 and 53 that is not connected to the input port 51 and the drain port 54. In other words, the switching valve circuit 50 switches not only the communication states between the input port 51 and the output ports 52 and 53 but also the communications states between the output ports 52 and 53 and the drain port 54. In this manner, the hydraulic fluid that is supplied from the hydraulic pressure supply source 40 can be selectively supplied to any one of the cylinder chambers 27a and 27b and the other one can be open to the atmosphere so that a differential pressure is generated between the cylinder chambers 27a and 27b. The switching valve circuit 50 may be connected to a throttle valve or a high-resistance pipe, without the other one being open to the atmosphere, to load a back pressure or may be a so-called run-around circuit that communicates with the hydraulic fluid supply side cylinder chamber. In addition, a traveling direction of the piston heads 18 can be switched by selectively switching between the cylinder chambers 27a and 27b to which the hydraulic fluids are supplied. In addition, the switching valve circuit 50 is provided with a function for completely blocking the input port 51, the output ports 52 and 53, and the drain port 54 from each other without allowing them to communicate with each other.

Hydraulic pressure sensors (hydraulic pressure detection unit) S1 and S2, which detect the hydraulic pressures of the hydraulic fluids supplied to the cylinder chambers 27a and 27b, are attached to respective hydraulic pressure circuits between the switching valve circuit 50 and the cylinder chambers 27a and 27b of the mold opening and closing cylinder 23. Detection results of the hydraulic pressure sensors S1 and S2 are input into the control unit 60. It is preferable that the hydraulic pressure sensors are provided in the vicinity of the cylinder chambers 27a and 27b so that the hydraulic pressures of the cylinder chambers 27a and 27b can be accurately detected. However, the hydraulic pressure sensors may be disposed between the hydraulic pressure supply source 40 and the input port 51 of the switching valve circuit 50.

The control unit 60 outputs the control command to each of the servomotors 42 of the hydraulic pressure supply source 40 and the switching valve circuit 50 and controls an expansion and contraction operation of the mold opening and closing cylinder 23. A speed pattern of the movable mold plate 14 can be set and input by a user into the control unit 60 via an operation panel (not illustrated) or the like. The control unit 60 sets a discharge flow rate of the hydraulic pressure supply source 40 according to the speed pattern of the movable mold plate 14 and performs driving control on the servomotors 42.

When the hydraulic fluid is discharged from the hydraulic pressure supply source 40 at a flow rate exceeding an upper limit discharge flow rate of the main pump 41a, the control unit 60 controls the secondary pumps 41b so that a certain number of the secondary pumps 41b corresponding to the difference between the upper limit of the main pump 41a and the exceeded flow rate are driven. In this manner, the flow rate of the hydraulic fluid can be increased by the number of the driven secondary pumps 41b and the mold opening and closing cylinder 23 can be in high-speed operation. The control unit 60 performs deceleration control for switching a displacement speed of the piston heads 18 from a high speed to a low speed in, for example, the vicinity of a stroke end when the mold opening and closing cylinder 23 is displaced in the extension direction or in a contraction direction. The deceleration control means control for decreasing the speed of the movable mold plate 14 by decreasing the flow rate of the hydraulic fluid supplied from the hydraulic pressure supply source 40 without controlling for aggressively braking a back pressure load and mechanical displacement of the piston heads 18 and the movable mold plate 14 by using a brake mechanism or the like or along with the braking control using the brake mechanism.

The control unit 60 is provided with a flow rate decrease control unit for deceleration (flow rate decrease control means for deceleration) 61 and a flow rate increase control unit (flow rate increase control means) 62.

When the deceleration control described above is performed, the flow rate decrease control unit for deceleration 61 drops rotation speeds of the servomotors 42 that drive the main pump 41a or the secondary pumps 41b according to a deceleration gradient of the movable mold plate 14 which is set in advance or decreases the flow rate of the hydraulic fluid discharged from the hydraulic pressure supply source 40 according to the deceleration gradient after stopping the secondary pumps 41b. In this manner, unnecessary driving of the hydraulic pumps 41 can be prevented and energy loss can be reduced. A limit of the deceleration gradient is determined on various conditions such as a mass of the movable mold plate 14, a sliding resistance between the movable mold plate 14 and the guide 16, and a braking force of the brake mechanism. Normally, a deceleration gradient that does not exceed the limit is set in advance.

When the deceleration control described above is performed by the flow rate decrease control unit for deceleration 61, the flow rate increase control unit 62 controls the flow rate of the hydraulic fluid discharged from the hydraulic pressure supply source 40 to be higher than the flow rate according to the deceleration gradient set in advance. More specifically, the control for increasing the flow rate of the hydraulic fluid is performed by using the secondary pump 41b whose driving is stopped in response to the decrease in the flow rate of the hydraulic fluid. Detection information of the respective hydraulic pressure sensors S1 and S2 described above are input in the flow rate increase control unit 62, and it is determined based on the detection information of the hydraulic pressure sensors S1 and S2 whether an inner portion of one of the cylinder chambers 27a and 27b to which the hydraulic fluid is supplied (hereinafter, simply referred to as supply side) has a pressure lower than a predetermined positive pressure set in advance.

Herein, the predetermined positive pressure set in advance is a threshold for detecting that the cylinder chamber 27a or the cylinder chamber 27b on the supply side is likely to have a negative pressure. The predetermined positive pressure set in advance is lower than a minimum driving pressure that is a minimum pressure required for displacing the movable mold plate 14 and is set to a small positive pressure which is close to the minimum driving pressure. The movable mold plate 14 is not stopped if the cylinder chamber 27a or the cylinder chamber 27b on the supply side has a hydraulic pressure that is higher than the minimum driving pressure. Accordingly, if a pressure higher than the minimum driving pressure is a threshold at which the movable mold plate 14 is stopped, the hydraulic fluid is supplied at a flow rate exceeding the flow rate of the hydraulic fluid required for an operation along the deceleration gradient set in advance, and the movable mold plate 14 may be operated at a speed equal to or higher than the deceleration gradient set in advance when the negative pressure of the cylinder chamber 27a or the cylinder chamber 27b on the supply side is released. In a case where the threshold is a pressure excessively lower than the minimum driving pressure, the cylinder chamber 27a or the cylinder chamber 27b on the supply side may have a negative pressure between a point of time when a predetermined pressure is detected and a point of time when the amount of the supplied hydraulic fluid is increased and the increase in the amount of the hydraulic fluid may not be available in time. The minimum driving pressure is a pressure that is determined on the mass and a load of the movable mold plate 14, the sliding resistance of the guide 16, and the like. The minimum driving pressure can be obtained in advance by measurement in a mold opening and closing operation experiment separate from a molding operation and a manual or automatic mold opening and closing operation during the molding operation or can be obtained in an operation simulation allowing for inertia of the movable mold plate 14 including the movable mold 12.

In a case where the detection result of one of the hydraulic pressure sensors S1 and S2 that is placed on the supply side is determined to be below the predetermined positive pressure described above, the flow rate increase control unit 62 performs increase control for increasing the flow rate of the hydraulic fluid by driving the stopped secondary pump 41b. Then, the flow rate increase control unit 62 performs feedback control so that the detection result of one of the hydraulic pressure sensors S1 and S2 that is placed on the supply side becomes the predetermined positive pressure and stops the increase control at a point of time when the detection result becomes the predetermined pressure.

Figure 3A:
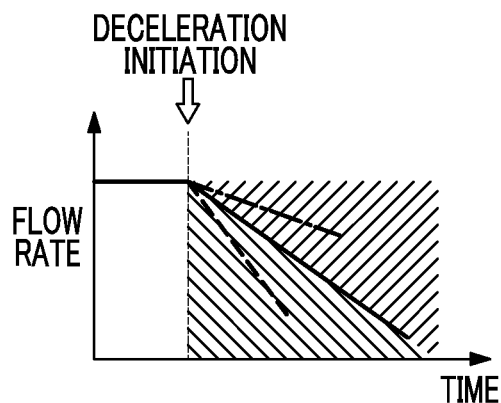
FIG. 3A is a diagram illustrating an example of a flow rate decrease gradient of a hydraulic fluid during deceleration.
Figure 3B:
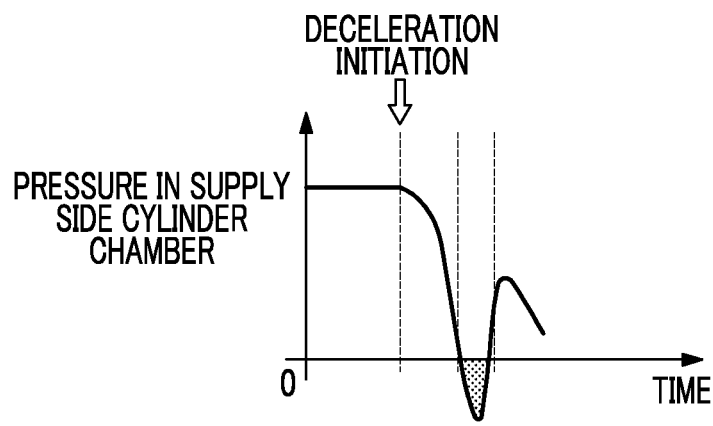
FIG. 3B is a diagram illustrating a pressure change in a cylinder chamber according to a comparative example.

FIG. 3A shows how the flow rate of the hydraulic fluid changes when the deceleration control is performed. FIG. 3B shows how the pressure of the hydraulic fluid changes when the deceleration control is performed. A case where the supply side is the cylinder chamber 27a is described as an example in the description of FIGS. 3A to 3C.

The solid line in FIG. 3A represents a lower limit of the flow rate of the hydraulic fluid at which the inner portion of the cylinder chamber 27a does not have a negative pressure. The dashed line in FIG. 3A represents an example of a flow rate gradient that causes a negative pressure in the inner portion of the cylinder chamber 27a which may result in a gap, a temporary stop, and a stick-slip. The one-dot chain line in FIG. 3A represents an example of the flow rate gradient with which the inner portion of the cylinder chamber 27a is sure to be maintained at a positive pressure so that the temporary stop and the stick-slip can be prevented. In the case of a slope that is gentler than the flow rate gradient illustrated by the solid line as with the flow rate gradient illustrated by the one-dot chain line, a movement speed of the movable mold plate 14 is higher than in the solid-line flow rate gradient. In the case of a gradient that is steeper than the flow rate gradient illustrated by the solid line as with the flow rate gradient illustrated by the dashed line, a movement of the movable mold plate 14 is hampered due to the temporary stop attributable to the gap or the like and the movement speed may be decreased.

Figure 4:
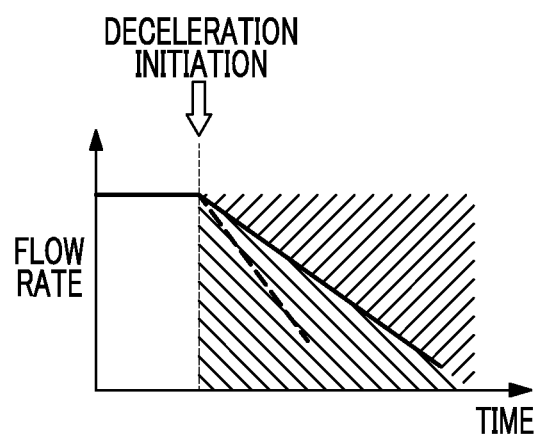
FIG. 4 is a diagram illustrating an example of a deceleration gradient of a movable mold plate of the mold-clamping device.

Even in a case where an operation flow rate of the hydraulic pressure supply source 40 is changed to the flow rate gradient of the hydraulic fluid according to the deceleration gradient set in advance, a deviation may occur between the deceleration gradient set in advance and the actual deceleration gradient due to a disturbance such as an increase in the mass and the load of the movable mold plate 14 and a drop in the sliding resistance. More specifically, the movement speed of the movable mold plate 14 has the deceleration gradient (illustrated by the solid line) that is gentler than the deceleration gradient set in advance (illustrated by the dashed line) as illustrated in FIG. 4 and more time is taken for the deceleration. In a case where more time is taken for the deceleration as in this case, the flow rate gradient of the hydraulic fluid based on the flow rate gradient illustrated by the solid line in FIG. 3A relatively deviates to the flow rate gradient side illustrated by the one-dot chain line illustrated in FIG. 3A. In this case, the hydraulic pressure in the cylinder chamber 27*a* may be a negative pressure, due to a shortage of the flow rate of the hydraulic fluid, at a timing at which the deceleration is terminated as in the comparative example illustrated in FIG. 3B. This is because the movable mold plate 14 continues to move due to inertia and a speed at which the volume of the cylinder chamber 27*a* expands is higher than the amount of the hydraulic fluid whose supply amount drops although the amount of the supplied hydraulic fluid is dropped by the deceleration control according to the deceleration gradient set in advance. In other words, even though the amount of the supplied fluid continues to be dropped by the deceleration control, the drop in the speed at which the volume of the cylinder chamber 27*a* expands is small due to the inertia, and thus the negative pressure increases. As a result, the movable mold plate 14 is stopped until the negative pressure is released.

Figure 3C:
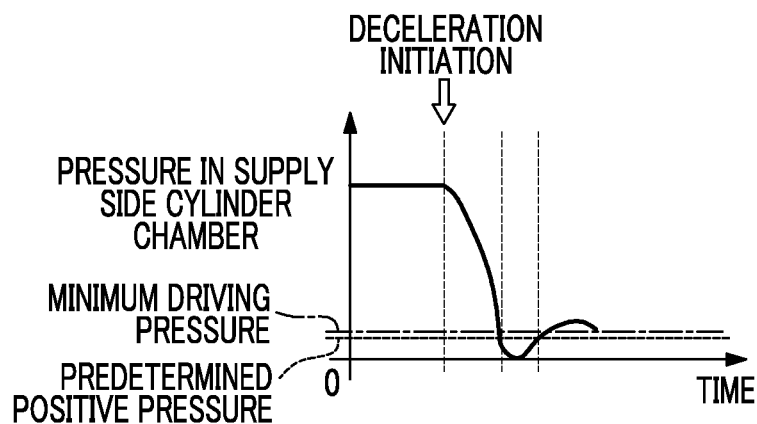
FIG. 3C is a diagram illustrating a pressure change in a cylinder chamber according to the embodiment.

As illustrated in FIG. 3C, however, the flow rate of the hydraulic fluid can be increased by the hydraulic pressure supply source 40 when a predetermined positive pressure that is lower than the minimum driving pressure is achieved in the case of the mold-clamping device 3 according to this embodiment. Accordingly, the hydraulic pressure can be increased immediately before the cylinder chamber 27*a* has a negative pressure therein, and generation of the gap can be prevented. A case where the hydraulic fluid is supplied to the cylinder chamber 27*a* has been described as an example, but this is similar to a case where the hydraulic fluid is supplied to the cylinder chamber 27*b*.

Figure 5:
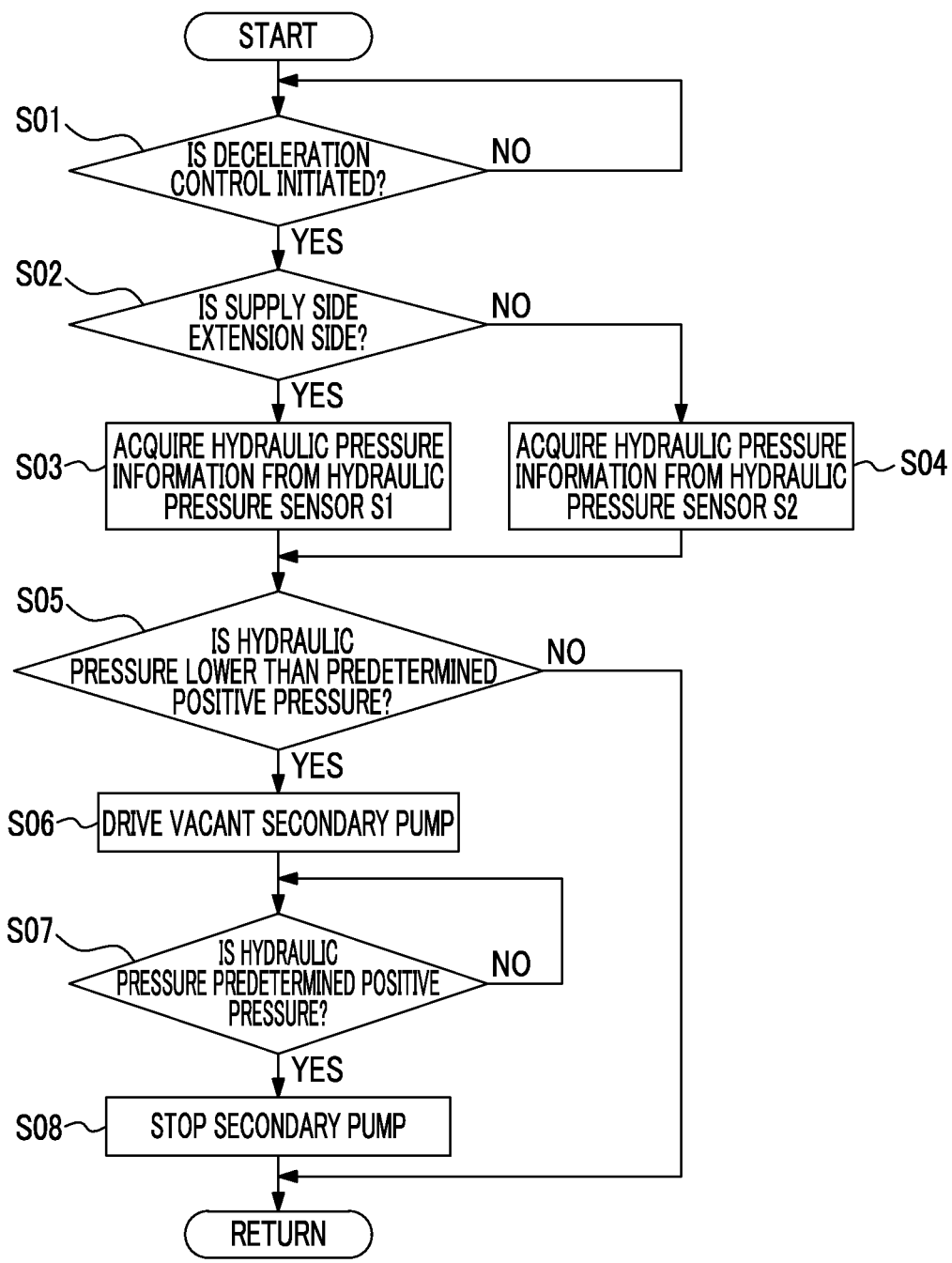
FIG. 5 is a flowchart illustrating control processing during deceleration of the movable mold plate.

Hereinafter, hydraulic fluid increase control processing (flow rate increase process) by the flow rate increase control unit 62 will be described with reference to the flowchart in FIG. 5.

Firstly, it is determined whether or not the deceleration control for the movable mold plate 14 by the flow rate decrease control unit for deceleration 61 is initiated (Step S01). In a case where the deceleration control is determined not to be initiated (NO in Step S01), this processing is repeated. In a case where the deceleration control is determined to be initiated (YES in Step S01), it is determined whether or not the hydraulic fluid is supplied to the cylinder chamber 27*a* on an extension side that extends the mold opening and closing cylinder 23 in the mold opening and closing cylinder 23 (Step S02). Step S02 is not required in a case where it is already determined whether the hydraulic fluid is supplied to the cylinder chamber 27*a* on the extension side that extends the mold opening and closing cylinder 23 or the cylinder chamber 27*b* at a point of time when the deceleration control is initiated. In a case where the hydraulic fluid is determined to be supplied to the cylinder chamber 27*a* (YES in Step S02), the detection result of the hydraulic pressure sensor S1 is handled as hydraulic pressure information. In a case where the hydraulic fluid is determined to be supplied to the cylinder chamber 27*b* (NO in Step S02), the detection result of the hydraulic pressure sensor S2 is handled as hydraulic pressure information.

Then, it is determined whether or not the detected hydraulic pressure is lower than a predetermined positive hydraulic pressure set in advance based on the acquired hydraulic pressure information (Step S05; determining means). In a case where the detected hydraulic pressure is determined not to be lower than the predetermined positive hydraulic pressure set in advance as a result of the determination (NO in Step S05), a series of the processing described above is temporarily terminated and the processing returns to the initial processing. In a case where the detected hydraulic pressure is determined to be lower than the predetermined positive hydraulic pressure set in advance (YES in Step S05), the stopped and vacant secondary pump 41*b* is driven so that the flow rate of the hydraulic fluid is increased (Step S06).

Then, it is determined whether or not the hydraulic pressure detected by one of the hydraulic pressure sensors S1 and S2 that is on the supply side increases to the predetermined positive hydraulic pressure (Step S07). In a case where the hydraulic pressure detected by one of the hydraulic pressure sensors S1 and S2 that is on the supply side is determined not to increase to the predetermined positive hydraulic pressure as a result of the determination (NO in Step S07), the determination processing is repeated. In a case where the hydraulic pressure detected by one of the hydraulic pressure sensors S1 and S2 that is on the supply side is determined to increase to the predetermined positive hydraulic pressure (YES in Step S07), the secondary pump 41*b* that is driven so as to increase the flow rate of the hydraulic fluid is stopped and a series of the processing described above is temporarily terminated.

According to the mold-clamping device 3 of the embodiment described above, the flow rate of the hydraulic fluid that is supplied to the mold opening and closing cylinder 23 can be decreased according to the predetermined deceleration gradient set in advance by the flow rate decrease control unit for deceleration 61 during the deceleration such as the displacement of the movement speed of the movable mold plate 14 from a high speed to a low speed. In addition, the flow rate of the hydraulic fluid that is supplied to the mold opening and closing cylinder 23 can be increased by the flow rate increase control unit 62 and a more-than-necessary drop in the hydraulic pressure can be prevented even in a case where the speed of the movable mold plate 14 is unlikely to be dropped due to an increase in the mass of the movable mold plate 14, a drop in the sliding resistance, and the like and the actual deceleration gradient becomes gentler than the predetermined deceleration gradient set in advance. As a result, the occurrence of the temporary stop and the stick-slip attributable to a drop in the hydraulic pressure in the mold opening and closing cylinder 23 can be prevented and time taken for mold opening and closing can be shortened with a simple configuration causing little energy loss.

The drop in the hydraulic pressure of the supply side cylinder chamber of the mold opening and closing cylinder 23 can be detected based on the actual hydraulic pressure detected by the hydraulic pressure sensors S1 and S2, and the flow rate of the hydraulic fluid can be increased at a point of time when the supply side cylinder chamber of the mold opening and closing cylinder 23 is determined to have a pressure lower than the predetermined positive pressure therein. Accordingly, the flow rate of the hydraulic fluid can be increased and the hydraulic pressure can be raised before the hydraulic pressure is dropped to the negative pressure at which the movable mold plate 14 is temporarily stopped or the stick-slip occurs, and thus reliability can be further improved.

Since the hydraulic pressure supply source 40 is provided with the main pump 41*a* and the plurality of secondary pumps 41*b*, the flow rate of the hydraulic fluid can be increased by using the secondary pumps 41*b* while the flow rate of the main pump 41*a* is being decreased when the movement of the movable mold plate 14 is decelerated. In a relatively large mold-clamping device in which the plurality of hydraulic pumps 41 are used to drive the mold opening and closing cylinder 23, the stopped secondary pump 41*b* can be effectively used as a pump increasing the flow rate of the hydraulic fluid during the deceleration of the movable mold plate 14.

In most cases, bubbles are generated in the hydraulic fluid when the pressure of the hydraulic fluid becomes a negative pressure due to a rapid expansion of the cylinder chamber volume or the like. The bubbles may result in malfunctioning of the hydraulic actuator and cavitation in the pipe. However, the mold-clamping device 3 according to this embodiment can prevent the pressure of the hydraulic fluid from becoming a negative pressure, and thus the generation of the bubbles in the hydraulic fluid can be prevented.

In addition, the hydraulic pressure of the cylinder chamber 27*a* or the cylinder chamber 27*b* on the supply side of the mold opening and closing cylinder 23 that is lower than the predetermined positive pressure can be raised to the predetermined positive pressure smoothly and reliably through the feedback control. Accordingly, a more-than-necessary rise in the hydraulic pressure, which causes energy loss, can be prevented.

In addition, the flow rate of the hydraulic fluid can be increased in a case where the cylinder chamber 27*a* or the cylinder chamber 27*b* on the supply side of the mold opening and closing cylinder 23 is likely to have a negative pressure therein. Accordingly, the occurrence of the negative pressure can be prevented and the cycle time prolongation attributable to the temporary stop and the stick-slip can be suppressed even without having to decrease the hydraulic fluid to be along the deceleration gradient of the movable mold plate 14 or not to generate an excessive difference from a predetermined deceleration gradient. In addition, an expensive device such as a servo valve is not required and the configuration can be simpler than in a case where speed feedback is performed. Accordingly, cost reduction can be achieved.

The present invention is not limited to each of the embodiments described above and can be modified in design without departing from the scope of the present invention.

In the embodiment described above, a case where the increase in the flow rate of the hydraulic fluid is stopped at a timing at which the hydraulic pressure that is detected by the hydraulic pressure sensor S1 or the hydraulic pressure sensor S2 on the supply side becomes a predetermined positive hydraulic pressure which is a threshold at which the increase in the flow rate of the hydraulic fluid is initiated after the initiation of the increase in the flow rate of the hydraulic fluid by the flow rate increase control unit 62 has been described. However, the present invention is not limited to this configuration. A case where the threshold of the hydraulic pressure at which the increase in the flow rate of the hydraulic fluid is initiated and the threshold of the hydraulic pressure at which the increase in the flow rate of the hydraulic fluid is stopped have the same value as in the embodiment described above is advantageous in view of simplification of the control, but this is optional. For example, the threshold of the hydraulic pressure at which the increase in the flow rate of the hydraulic fluid is stopped and the threshold of the hydraulic pressure at which the increase in the flow rate of the hydraulic fluid is initiated may be set to different values. In a case where the response of the hydraulic pressure supply source 40 on the supply side is not high, a case where a pipe length is large from the hydraulic pressure supply source 40 on the supply side to the mold opening and closing cylinder 23, and the like, a significant time lag is present from the response of the hydraulic pressure supply source 40 on the supply side to initiation of discharge of the hydraulic fluid by the hydraulic pressure supply source 40 even if a command for increasing the flow rate of the hydraulic fluid is sent from the flow rate increase control unit 62 and a significant time lag is present until discharge pressure from a hydraulic pressure pump reaches the cylinder chamber 27*a* or 27*b* due to pipe resistance. In these cases, the pressure in the cylinder chamber 27*a* or 27*b* may become a negative pressure during the time lag when the flow rate of the hydraulic fluid is increased and the time lag may cause the hydraulic fluid to be supplied at a more-than-necessary flow rate and result in speed control overshooting when the increase in the flow rate of the hydraulic fluid is stopped. In these cases, it is preferable that the threshold of the hydraulic pressure at which the increase in the flow rate of the hydraulic fluid is initiated is a value close to the minimum driving pressure and the threshold of the hydraulic pressure at which the increase in the flow rate of the hydraulic fluid is stopped is a value that is lower than the threshold of the hydraulic pressure at which the increase in the flow rate of the hydraulic fluid is initiated.

Figure 6:
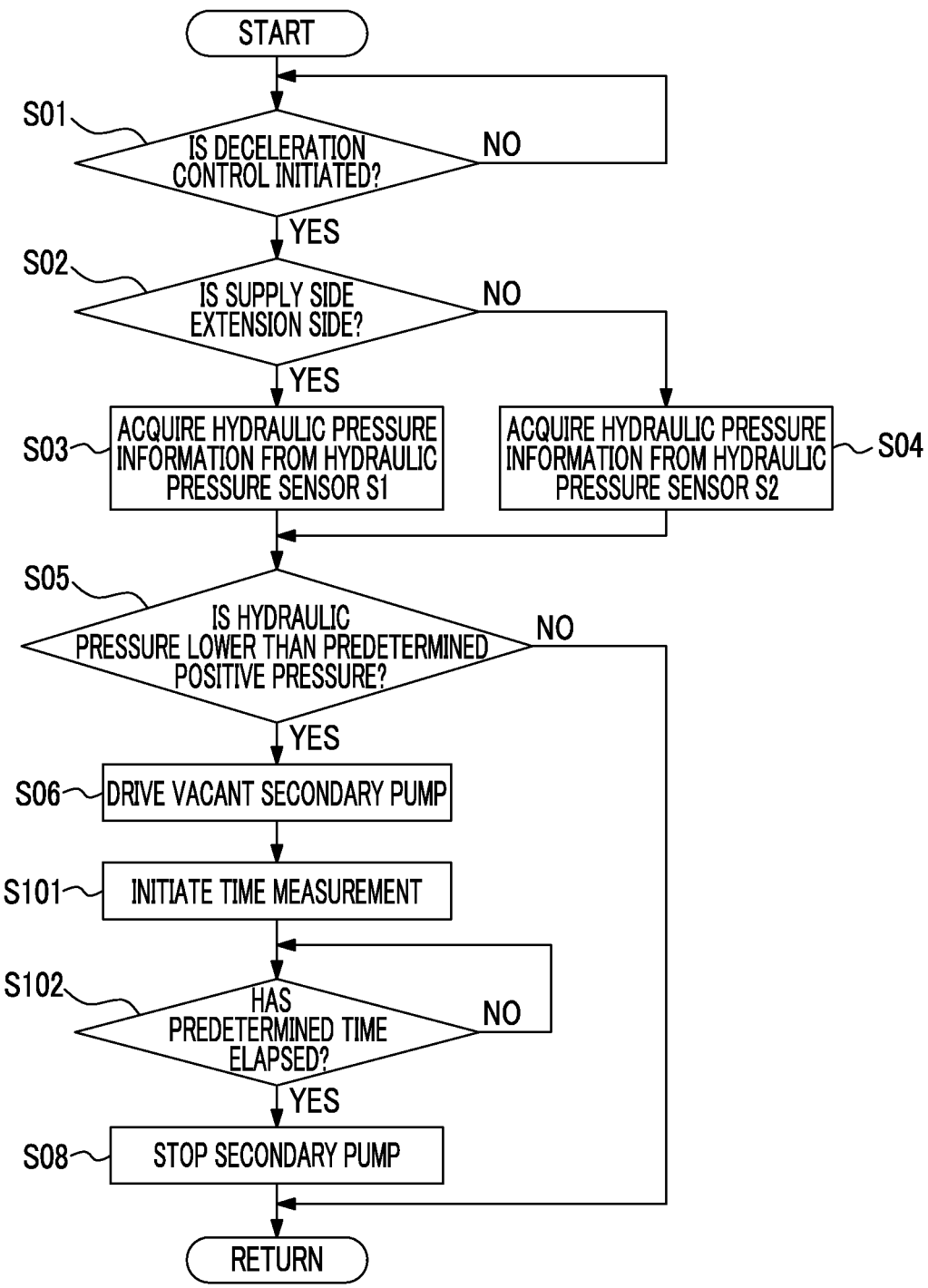
FIG. 6 is a flowchart, corresponding to FIG. 5, according to a first modification example of the embodiment.
Figure 7:
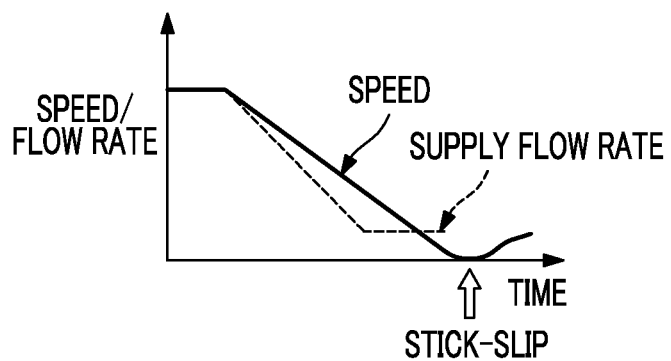
FIG. 7 is a graph illustrating a movement speed of a movable mold plate in a case where inertia of the movable mold plate is large.
Figure 8:
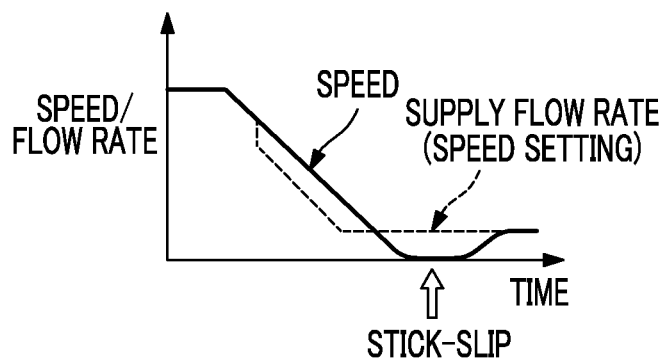
FIG. 8 is a graph illustrating a movement speed of a movable mold plate in a case where a deceleration is set for a deceleration gradient limit of the movable mold plate to be exceeded.

In the embodiment described above, the timing at which the increase in the flow rate of the hydraulic fluid is stopped is determined based on the detection results of the hydraulic pressure sensors S1 and S2. However, for example, a timer may be used as a first modification example of the embodiment described above so that the increase in the flow rate of the hydraulic fluid is stopped at a timing at which a predetermined length of time set in advance elapses from the initiation of the increase in the flow rate of the hydraulic fluid. In this case, the processing of Step S07 illustrated in FIG. 5 may be replaced with Steps S101 and S102 illustrated in FIG. 6. The predetermined length of time described above, which is time taken until the hydraulic pressure sufficiently rises after the initiation of the increase in the flow rate of the hydraulic fluid, can be obtained in advance in an experiment, a simulation, or the like. In this case, movement speed detection such as speed feedback control for the movable mold plate 14 and setting of the threshold of the hydraulic pressure at which the increase in the flow rate of the hydraulic fluid is stopped become unnecessary, and thus the increase in the flow rate of the hydraulic fluid can be stopped at a practical timing without having to performing complex control.

Figure 9:
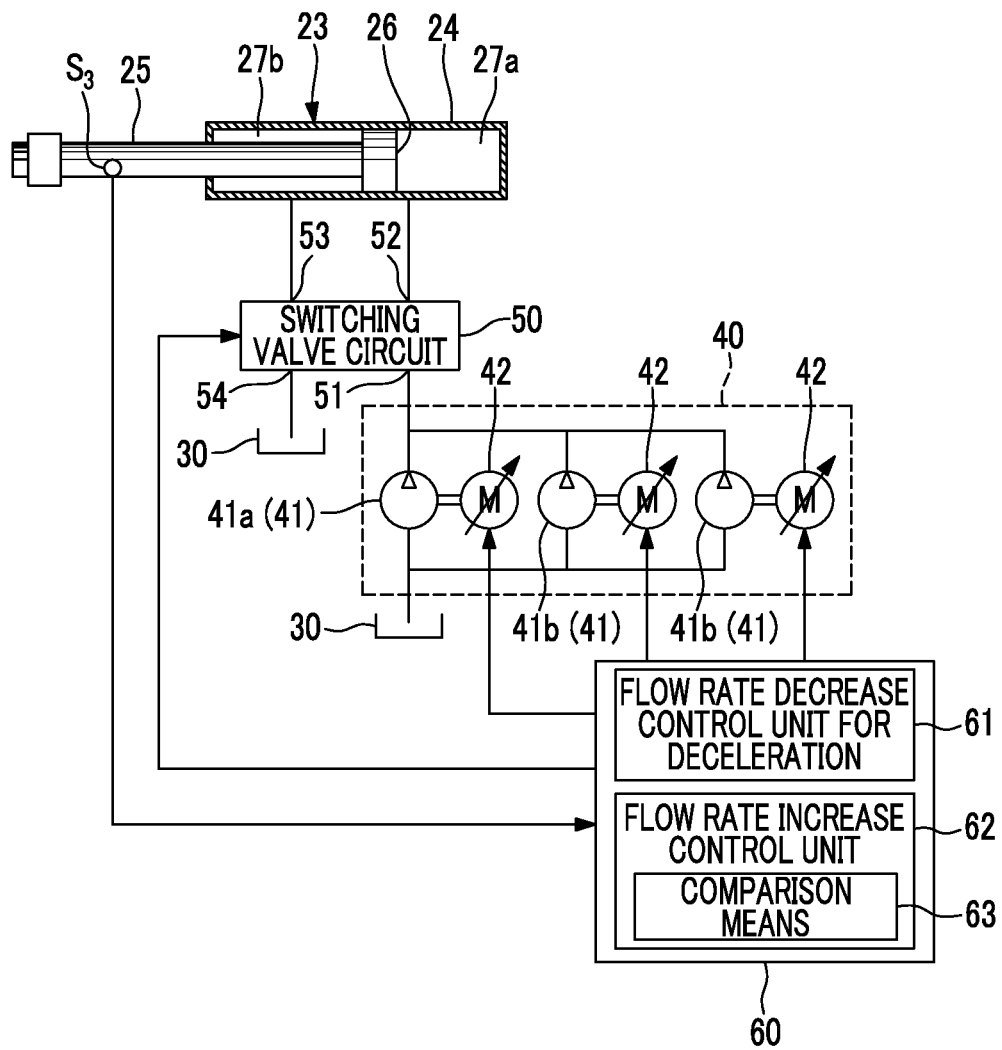
FIG. 9 is a diagram, corresponding to FIG. 2, according to a second modification example of the embodiment.

In the embodiment described above, the timing at which the increase in the flow rate of the hydraulic fluid is initiated is determined based on the detection results of the hydraulic pressure sensors S1 and S2. However, for example, the deceleration of the movement of the movable mold plate 14 according to a deceleration gradient set in advance may be initiated at a timing at which the movement speed of the movable mold plate 14 has a value that is higher by a predetermined amount or a predetermined ratio than the deceleration gradient in which the actual movement speed of the movable mold plate 14 is set in advance due to the inertia according to a second modification example of the embodiment described above. The mold-clamping device according to the second modification example is provided with a speed sensor (speed detection unit) S3, which detects a movement speed of the inner rod 25 of the mold opening and closing cylinder 23, instead of the hydraulic pressure sensors S1 and S2 of the mold-clamping device 3 of the embodiment described above as illustrated in FIG. 9. In the mold-clamping device according to the second modification example, the flow rate increase control unit 62 of the control unit 60 is provided with comparison means 63 for comparing a deceleration gradient according to a detection result of the speed sensor S3 to the deceleration gradient of the mold opening and closing cylinder 23 set in advance. In a case where the speed of the mold opening and closing cylinder 23 is determined by the comparison means 63 to exceed a predetermined speed gradient set in advance by a predetermined amount or by a predetermined ratio, the flow rate increase control unit 62 increases the flow rate of the hydraulic fluid when the flow rate of the hydraulic fluid is decreased by the flow rate decrease control unit for deceleration 61. In this case, speed feedback control requires a speed sensor or a position sensor detecting the speed or a position of the movable mold plate 14. However, the hydraulic pressure sensors S1 and S2 are not required, and thus pipe layout design can be easier and costs can be lower than in a case where the hydraulic pressure sensors S1 and S2 are used.

In the embodiment described above, an example in which the mold-clamping device 3 is disposed in the injection-molding device 1 has been described. However, the mold-clamping device 3 may be applied to molding devices, such as press molding devices, other than the injection-molding device 1.

In the embodiment described above, a case where the hydraulic pump 41 is driven by the servomotor 42 has been described. However, a motor that drives the hydraulic pump 41 is not limited to the servomotor 42 and may, for example, be a motor such as an inverter motor and a three-phase induction motor that are easily available and relatively inexpensive although larger than the servomotor 42.

It is preferable that the three-phase induction motor is used as the large motor which drives the main pump 41a for large-capacity discharge and the servomotor is used as the motor which drives the secondary pump 41b having a small discharge amount and increasing the amount of the hydraulic fluid with a high response. This configuration is effective in both cost and functional aspects.

In the modification examples of the embodiment described above, a case where the increase in the flow rate of the hydraulic fluid is stopped after a predetermined time elapses from the initiation of the increase in the flow rate of the hydraulic fluid has been described. However, the time that elapses from the initiation of the deceleration of the movable mold plate 14 may be measured by using a timer. In other words, the time measurement may be initiated when the drop in the flow rate of the hydraulic fluid is initiated and the increase in the flow rate may be stopped after a predetermined time elapses from the initiation of the increase in the flow rate of the hydraulic fluid.

In the embodiment described above, a case where the plurality of hydraulic pumps 41 are disposed in the hydraulic pressure supply source 40 has been described. However, the hydraulic fluid may be discharged by using only one hydraulic pump 41 without the secondary pump 41b being disposed. In this case, the flow rate of the hydraulic fluid may be controlled by the one hydraulic pump 41 for a flow rate in which the flow rate which is obtained by the flow rate decrease control unit for deceleration 61 is added to the flow rate which is obtained by the flow rate increase control unit 62.

In the embodiment described above, an example in which the so-called direct pressure-type mold-clamping device 3, where the hydraulic pressure directly acts as a clamping force without boost, is disposed in the injection-molding device 1 has been described. However, the present invention may also be applied to a non-direct pressure-type molding device provided with a mold-clamping device in which a toggle link-type boost link mechanism driven by the mold opening and closing cylinder 23 or another type of boost link mechanism is disposed.

INDUSTRIAL APPLICABILITY

The clamping device, the injection-molding device, and the method for opening and closing a mold described above prevent the occurrence of the temporary stop and the stick-slip attributable to the pressure drop in the hydraulic cylinder with the simple configuration causing little energy loss and can be applied to a mold-clamping device, an injection-molding device, and a method for opening and closing a mold capable of accelerating mold opening and closing.

REFERENCE SIGNS LIST

3 Mold-clamping device
11 Fixed mold
12 Movable mold
13 Fixed mold plate
14 Movable mold plate
23 Mold opening and closing cylinder (hydraulic cylinder)
40 Hydraulic pressure supply source
41a Main pump
41b Secondary pump
60 Control unit
61 Flow rate decrease control unit for deceleration (flow rate decrease control means for deceleration)
62 Flow rate increase control unit (flow rate increase control means)
63 Comparison means
S1, S2 Hydraulic pressure sensor (hydraulic pressure detection unit)
S3 Speed sensor (speed detection unit)
S05 Determining means

The invention claimed is:

1. A mold-clamping device comprising:
a fixed mold plate including a fixed mold;
a movable mold plate including a movable mold;
a hydraulic cylinder allowing the movable mold plate to approach or be separated from the fixed mold plate;
a hydraulic pressure supply source supplying a hydraulic fluid to the hydraulic cylinder;
a control unit performing driving control on the hydraulic pressure supply source; and
a hydraulic pressure sensor that is configured to detect a hydraulic pressure of the hydraulic fluid supplied to the hydraulic cylinder and is configured to output a detection result of the hydraulic pressure of the hydraulic fluid to the control unit,
wherein the control unit is configured to decrease a flow rate of the hydraulic fluid according to a deceleration gradient set in advance when a movement of the movable mold plate is decelerated according to the deceleration gradient set in advance, the control unit is configured to control the flow rate of the hydraulic fluid to increase when the flow rate of the hydraulic fluid is decreased according to the deceleration gradient set in advance by the control unit, the control unit is configured to determine whether or not a pressure in the hydraulic cylinder is lower than a predetermined positive pressure set in advance, and the control unit is configured to increase the flow rate of the hydraulic fluid when the flow rate of the hydraulic fluid is decreased in a case where the pressure in the hydraulic cylinder is determined to be lower than the predetermined pressure by the control unit.

2. The mold-clamping device according to claim 1, wherein the control unit is configured to perform feedback control so that the pressure in the hydraulic cylinder becomes the predetermined pressure in a case where the pressure in the hydraulic cylinder is determined to be lower than the predetermined pressure by the control unit.

3. The mold-clamping device according to claim 1, further comprising:

a speed detection unit detecting a movement speed of the hydraulic cylinder, wherein the control unit is configured to compare a deceleration gradient of the movement speed of the hydraulic cylinder to the deceleration gradient set in advance, and the control unit is configured to increase the flow rate of the hydraulic fluid when the flow rate of the hydraulic fluid is decreased in a case where a speed of the hydraulic cylinder is determined to exceed a predetermined speed gradient set in advance by a predetermined amount or by a predetermined ratio by the control unit.

4. The mold-clamping device according to claim 1, wherein the hydraulic pressure supply source includes a main pump controlled to be driven by the control unit; and a secondary pump controlled to be driven by the control unit.

5. The mold-clamping device according to claim 1, wherein the control unit is configured to stop increasing in the flow rate of the hydraulic fluid a predetermined time after initiation of the increase in the flow rate of the hydraulic fluid.

6. An injection-molding device comprising the mold-clamping device according to claim 1.

7. A method for opening and closing a mold for a mold-clamping device including a fixed mold plate having a fixed mold, a movable mold plate having a movable mold, and a hydraulic cylinder allowing the movable mold plate to approach or be separated from the fixed mold plate, the method comprising a flow rate increase step for increasing a flow rate of a hydraulic fluid supplied to the hydraulic cylinder when the movable mold plate is decelerated in a case where a pressure in the hydraulic cylinder is determined to be lower than a predetermined positive pressure lower than a minimum driving pressure of the hydraulic cylinder or a speed of the hydraulic cylinder is determined to exceed a predetermined speed gradient set in advance by a predetermined amount or by a predetermined ratio.

* * * * *